United States Patent [19]

Altimus

[11] Patent Number: 5,215,698
[45] Date of Patent: Jun. 1, 1993

[54] EXTRUSION TOOL AND METHOD OF EXTRUSION COATING

[75] Inventor: James F. Altimus, Three Rivers, Mich.

[73] Assignee: Americraft Machined Products, Inc., Columbia City, Ind.

[21] Appl. No.: 797,294

[22] Filed: Nov. 25, 1991

[51] Int. Cl.$^5$ ............................................. B29C 47/28
[52] U.S. Cl. ...................................... 264/167; 264/174; 425/113; 425/192 R; 425/461; 425/467
[58] Field of Search ............... 264/174, 209.2, 209.8, 264/167; 425/113, 461, 467, 114, 192 R, 191

[56] References Cited

U.S. PATENT DOCUMENTS

| | | |
|---|---|---|
| 1,859,901 | 5/1932 | Trebes . |
| 1,911,858 | 5/1933 | Trebes . |
| 2,105,812 | 1/1938 | Gordon et al. . |
| 2,411,660 | 11/1946 | Manning . |
| 2,766,481 | 10/1956 | Henning . |
| 2,893,056 | 7/1959 | Henning . |
| 3,121,255 | 2/1964 | Henning et al. . |
| 3,229,012 | 1/1966 | Garner . |
| 3,402,427 | 9/1968 | Christofas et al. ............... 425/113 |
| 3,404,432 | 10/1968 | White et al. . |
| 3,538,547 | 11/1970 | Drabb . |
| 3,574,810 | 4/1971 | Tournery et al. . |
| 3,606,632 | 9/1971 | Bunish et al. . |
| 3,635,620 | 1/1972 | Brown . |
| 3,725,192 | 4/1973 | Ando et al. . |
| 3,737,490 | 6/1973 | Nicholson . |
| 3,903,233 | 9/1975 | Dougherty . |
| 3,947,172 | 3/1976 | Myers .............................. 425/467 |
| 4,093,414 | 6/1978 | Swiatovy, Jr. . |
| 4,132,756 | 1/1979 | Ferrentino et al. ............... 425/114 |
| 4,303,734 | 12/1981 | Sullivan . |
| 4,309,160 | 1/1982 | Poutanen et al. .................. 264/174 |
| 4,354,989 | 10/1982 | Beach ............................... 425/113 |
| 4,436,778 | 3/1984 | Dugal . |
| 4,518,557 | 5/1985 | Wecker . |
| 4,547,328 | 10/1985 | Yuto et al. . |
| 4,568,507 | 2/1986 | Baxter . |
| 4,683,166 | 7/1987 | Yuto et al. . |
| 4,770,620 | 9/1988 | Steinecke et al. . |
| 4,789,589 | 12/1988 | Baxter . |
| 4,806,086 | 2/1989 | Bloch et al. ...................... 425/461 |
| 4,838,777 | 6/1989 | Weber ............................. 425/192 R |
| 4,940,504 | 7/1990 | Starnes, Jr. . |
| 4,999,148 | 3/1991 | Dumoulin et al. ................ 264/174 |

FOREIGN PATENT DOCUMENTS

| | | | |
|---|---|---|---|
| 2457249 | 6/1976 | Fed. Rep. of Germany ...... 264/174 |
| 53-61652 | 6/1978 | Japan ................................ 264/174 |
| 61-189918 | 8/1986 | Japan ................................ 425/113 |
| 7509554 | 2/1977 | Netherlands ...................... 264/174 |
| 570868 | 12/1975 | Switzerland ...................... 425/113 |

*Primary Examiner*—Jeffery Thurlow
*Attorney, Agent, or Firm*—Baker & Daniels

[57] ABSTRACT

An extrusion tool is provided for extruding a coating jacket onto a least one pre-coated conductor or conductor bundle. The extrusion tool comprises a frame, a first conical element, a second conical element, and a die. The frame is formed to include a port positioned to receive a coating material. The first conical element is mountable on the frame and is formed to include a bore, the bore being sized to allow passage of the pre-coated conductor or bundle therethrough. The second conical element is mateable with the first conical element and cooperates with the first conical element to define a first flow passageway therebetween. The first flow passageway is positioned to receive the pre-coated conductor or bundle as it exits from the bore and is connected in fluid communication with the port to supply an initial portion of the coating jacket. The second conical element also includes a tapered portion and terminates in a cylindrical tip. The die cooperates with the tapered portion and the cylindrical tip of the second conical element to define a second flow passageway therebetween to supply a final portion of the coating jacket. The cylindrical tip terminates upstream of the die face.

32 Claims, 2 Drawing Sheets

EXTRUSION TOOL AND METHOD OF EXTRUSION COATING

BACKGROUND AND SUMMARY OF THE INVENTION

The present invention relates to apparatus and methods for extruding coating onto a conductor. More particularly, the present invention relates to an extrusion tool for extruding a coating jacket onto at least one pre-coated conductor.

In the manufacture of multi-conductor cables, it is necessary to provide an extrusion apparatus capable of applying a coating jacket to a bundle of wires wherein individual wires in the bundle may already have been covered with a layer of insulative coating. In cases where a single type of coating jacket material is used, extrusion tools have been designed to apply the jacket material as a single layer to the pre-coated wire bundle. However, processing speeds are limited with such tooling arrangements.

Co-extrusion processes (i.e., processes involving the simultaneous application of multiple layers of coating material to a conductor) provide better processing speeds but have heretofore been used where two or more types of coating material are to be applied from separate material reservoirs. See, for example, U.S. Pat. No. 4,303,734 to Sullivan; U.S. Pat. No. 1,859,901 to Trebes.

Moreover, existing co-extrusion processes suffer from numerous problems which render them unattractive for use where only a single type of coating material is to be applied. For example, control of coating material temperature is more difficult where a co-extrusion process is used because the coating material to be used in the various layers is typically drawn from separate reservoirs.

In addition, it is often the case that outgassing occurs when multiple coating layers are applied to a wire or the like, resulting in formation of bubbles (and resultant cavities) between the layers. The bubble formation can cause separation or peeling of the layers. To address this problem, many co-extrusion devices are augmented with a source of vacuum to evacuate gas bubbles from the area between the layers as the layers are deposited. The use of a vacuum source significantly increases the processing time and can result in waste of the coating material.

Existing processes also generally require the use of filler materials to fill voids between the conductor bundle and the coating jacket. Some existing tooling is designed specifically to allow paper tape filler to be wrapped around the conductor. See, for example, U.S. Pat. No. 4,568,507 to Baxter. Breakage of the paper tape, resulting in excessive downtime, is a common problem with tooling which relies upon paper tape filler.

Other multiple layer extrusion process, and tooling used therein, is designed to place various types of filaments between the conductor and the jacket to serve both as filler and as reinforcing material. For example, U.S. Pat. No. 4,132,756 to Ferrentino et al. relates to a process for extruding plastomeric or elastomeric material onto at least two filaments.

According to the present invention, an extrusion tool is provided for extruding a coating jacket onto at least one pre-coated conductor. The extrusion tool comprises a frame, a first conical element mountable in the frame, a second conical element mateable with the first conical element, and a die mountable in the frame. The frame is formed to include a port positioned to receive the coating. The first conical element is formed to include a bore, the bore being sized to allow passage of the pre-coated conductor (or conductor bundle) therethrough.

The second conical element cooperates with the first conical element to define a first flow passageway therebetween. The first flow passageway is positioned to receive the pre-coated conductor as it exits from the bore and is connected in fluid communication with the port to supply an initial portion of the coating jacket from the port to the pre-coated conductor as the pre-coated conductor exits the bore and enters the first flow passageway. In addition, the second conical element also includes a tapered portion. The second conical element terminates in a cylindrical tip.

The die cooperates with the tapered portion and the cylindrical tip of the second conical element to define a second flow passageway therebetween. The second flow passageway is in fluid communication with the port to supply a final portion of the coating jacket from the port to the pre-coated conductor as the pre-coated conductor exits the first flow passageway.

Advantageously, the tool provides for separation of the coating jacket material into the first and second flow passageways and remarriage of the material as initial and final portions of the coating jacket in such a manner that no gassing occurs, eliminating the need to provide a vacuum source.

Further advantageously, the initial portion of the coating jacket is applied to the at least one pre-coated conductor so as to create an inwardly-projecting rib extending between the initial portion of the coating jacket and the pre-coated conductor. The rib fills voids between the jacket and the conductor, eliminating the need for paper filler. The rib also provides reinforcement, eliminating the need to provide filaments around the conductor.

The present invention also relates to a method for extruding coating from a single source onto at least one pre-coated conductor. The method involves use of an extrusion tool including a frame, the frame being formed to include an interior region including a cylindrical portion and a port for communicating coating from the single source to the interior region. The extrusion tool further includes means for providing a branched flow passageway in the interior region, the providing means terminating in a cylindrical tip mateable with the cylindrical portion so that the branches of the branched flow passageway are concentric at their downstream ends.

The method comprises the steps of arranging the providing means in the frame so that approximately 65% or less of the cylindrical tip extends into the cylindrical portion, moving the conductor into the interior region, feeding the coating from the single source to the port, flowing a first portion of the coating from the port through a first branch of the branched passageway for extrusion onto the conductor as an initial portion of the coating jacket, and flowing a second portion of the coating from the port through a second branch of the branched passageway for extrusion onto the conductor as a final portion of the coating jacket.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The drawings refer particularly to the accompanying figures in which.

DETAILED DESCRIPTION OF THE DRAWINGS

Figure 1:
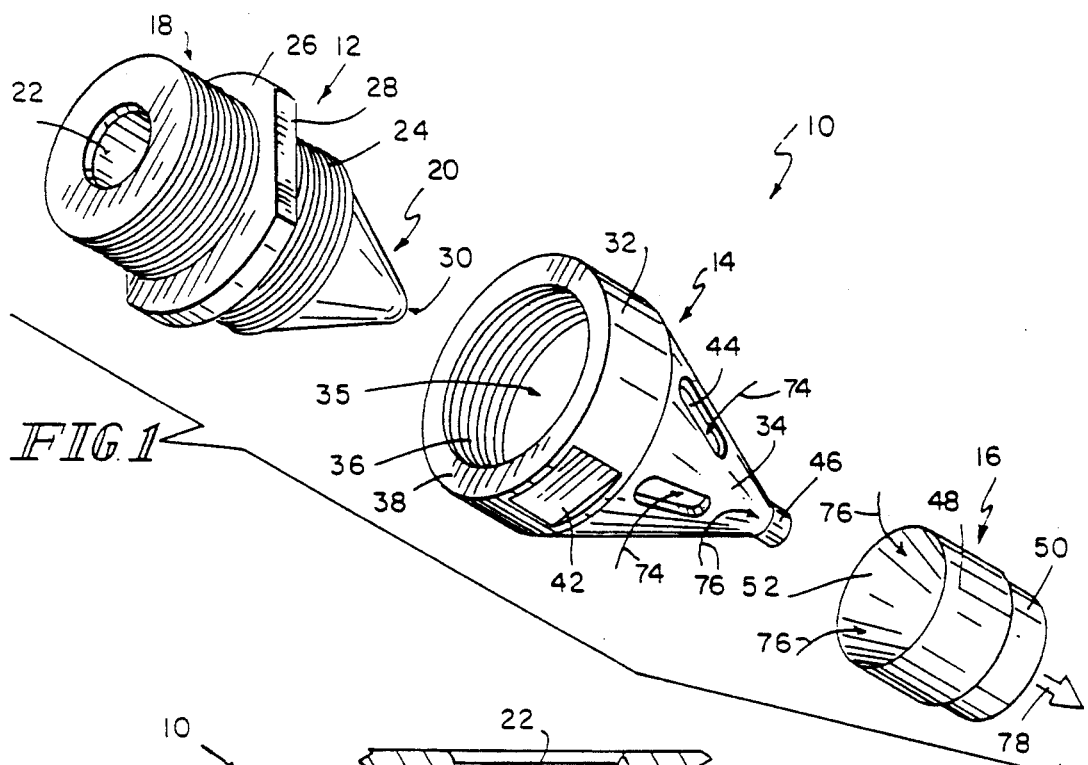
FIG. 1 is an assembly view of one embodiment of an apparatus in accordance with the present invention showing first and second conical elements and a die.
Figure 2:
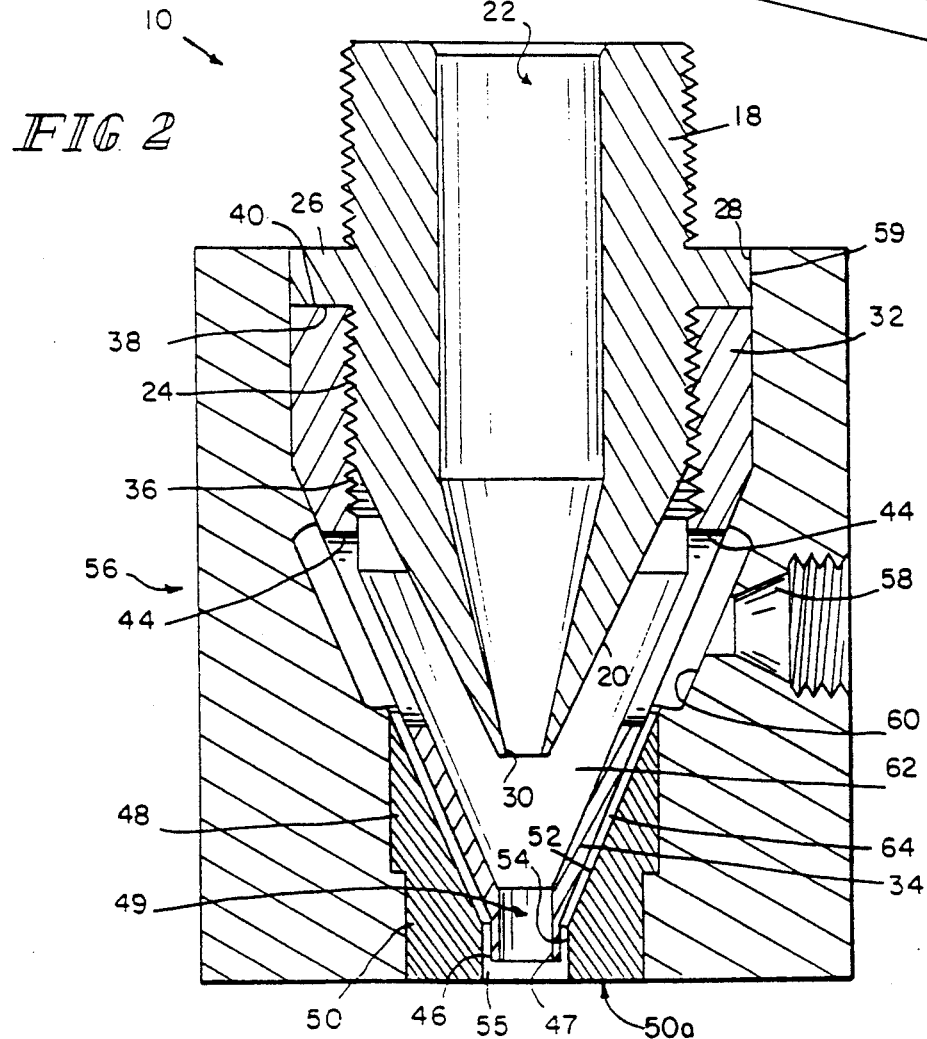
FIG. 2 is a sectional view of the apparatus of FIG. 1 assembled in a crosshead to show first and second flow paths for coating material.
Figures 3, 4:
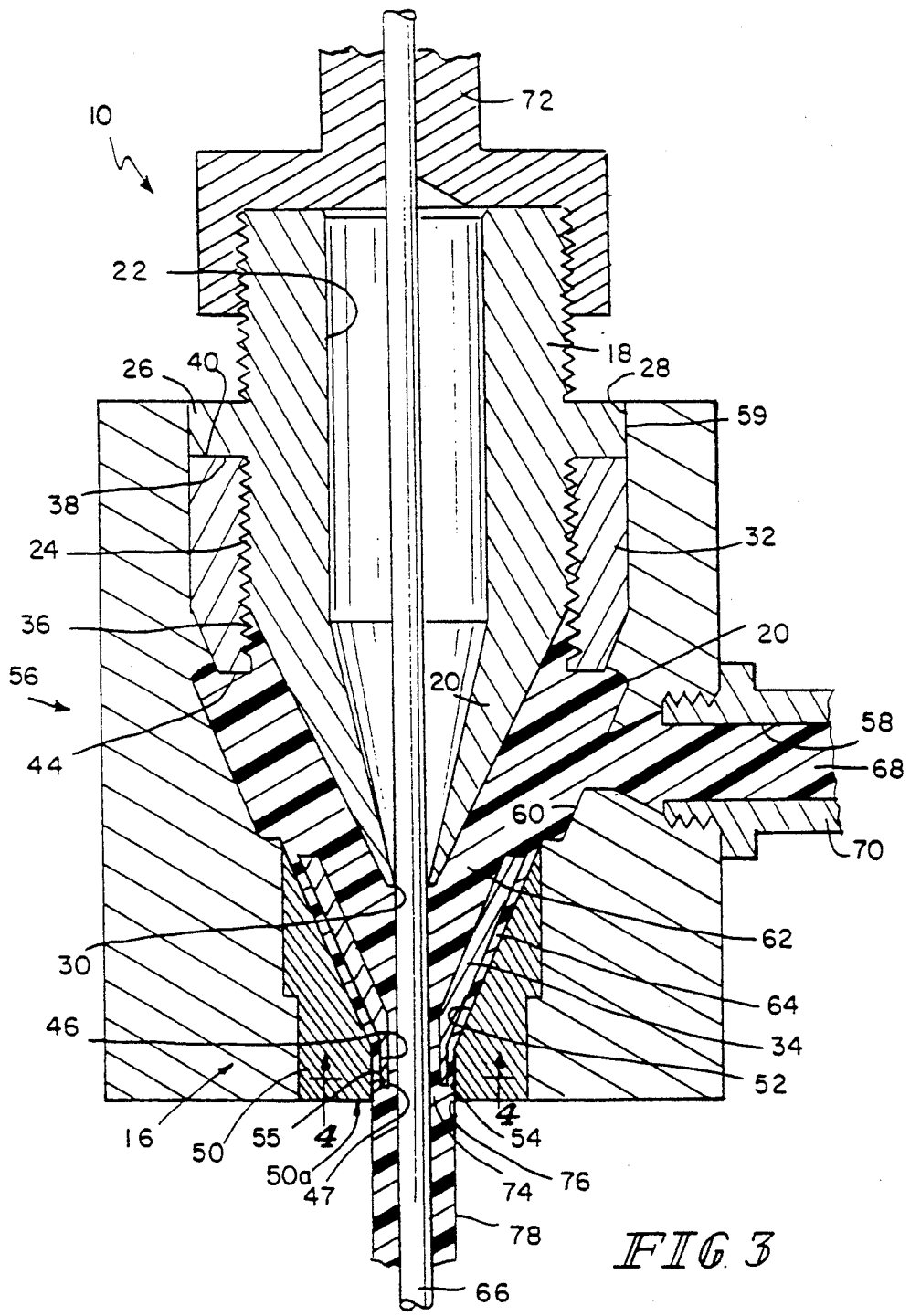
FIG. 3 is a view similar to that of FIG. 2 showing coating material flowing through a port formed in the crosshead to reach the first and second flow paths to be deposited on a pre-coated conductor.
FIG. 4 is an enlarged cross-sectional end view showing inner and outer concentric exit openings for flow of the initial and final portions of the coating jacket material therethrough.

An embodiment of an extrusion tool 10 in accordance with the present invention is illustrated in FIG. 1. As shown, extrusion tool 10 includes a first conical element 12, a second conical element 14, and a die 16. When elements 12 and 14 are assembled with die 16 in a standard frame or crosshead 56 (as shown in FIGS. 2-3), elements 12 and 14 cooperate with die 16 to provide a branched flow path for molten material entering crosshead 56 from a single source (not shown).

First conical element 12 includes a cylindrical portion 18 and a tapered portion 20 integral with portion 18. A bore 22 formed in element 12 extends through both portions 18, 20. Bore 22 is sized to allow passage of a pre-coated conductor or bundle of pre-coated conductors 66 therethrough as shown in FIG. 3.

An annular flange 26 is appended to portion 18 about halfway along the longitudinal extent thereof. Flange 26 is provided with a pair of flats 28 mateable with flats 59 on crosshead 56 (see FIG. 2) to retain first conical element 12 nonrotatably within crosshead 56.

Tapered portion 20 terminates in a tip formed to include a tapered end opening 30 of bore 22. Opening 30 has an inner diameter of about ⅜ inch. The inner diameter of opening 30 is approximately equal to the outer diameter of the wire or bundle of pre-coated conductors 66 to which the coating jacket is to be applied (see, e.g., FIG. 3). Advantageously, the outer surface of the pre-coated conductor bundle 66 contacts the tip bordering opening 30 to smooth at least some of the irregularities which may be present in the coating in the pre-coated conductor or bundle immediately before application of the molten material.

Second conical element 14 includes an annular portion 32, a tapered portion 34, and a cylindrical tip 46. In addition, second conical element 14 defines an interior region 35, a portion of which serves as a first flow passageway 62 for molten coating material as will be subsequently described. When assembled to crosshead 56, second conical element 14 extends into an annular interior cavity defined between tapered portion 20 and interior walls of crosshead 56.

Annular portion 32 includes threads 36 mateable with threads 24 formed on first conical element 12. Annular portion 32 also includes an axially-directed face 38. When element 14 is assembled to element 12, element 12 is threaded onto threads 36 so that face 38 mates with an axially-directed face 40 on flange 26 (shown best in FIGS. 2-3). Thus, flange 26 cooperates with face 38 to provide a stop so that element 12 extends into interior region 35 of element 14 no more than a predetermined amount.

Annular portion 32 further includes a pair of circumferentially spaced flats 42. Flats 42 allow for easy gripping of element 14 by a tool (not shown) for insertion of element 14 into crosshead 56.

Tapered portion 34 includes a plurality of elongated slots 44 formed therein. Six slots 44 are provided in equally spaced intervals about the tapered face of tapered portion 34 in the illustrated embodiment. Slots 44 extend between annular portion 32 and cylindrical tip 46. Advantageously, slots 44 are sized to provide an area for flow of coating material therethrough for formation of an initial portion of the coating jacket having a predetermined thickness.

Tapered portion 34 terminates in a cylindrical tip 46 defining an inner exit opening 47 (shown best in FIG. 4). In preferred embodiments, cylindrical tip 46 is about 0.25 inches long. As shown, cylindrical tip 46 defines a terminal portion 49 of first flow passageway 62. Terminal portion 49 terminates at inner exit opening 47.

Opening 47 is sized to receive a pre-coated conductor or conductor bundle from interior region 35 for passage therethrough. Opening 47 also provides an inner exit opening for molten coating material to exit from first flow passageway 62. The inner diameter of opening 47 varies with the outer diameter of the pre-coated conductor as is described in more detail below. It is thought that the provision of cylindrical tip 46, in proper alignment with die 16, as described below, creates flow passageways appropriately configured to provide the advantages of the present invention. Die 16 includes a first portion 48 and a second portion 50 integral with first portion 48. Die 16 includes an interior tapered wall 52 and an interior cylindrical wall 54 (shown in FIGS. 2-3), also referred to as a die land, and an exit face 50a.

Tapered wall 52 cooperates with tapered portion 34 of element 14 to form a portion of a second flow passageway 64 for molten coating material. Cylindrical wall 54 likewise cooperates with cylindrical tip portion 46 to form another portion of second flow passageway 64 for molten coating material. Second flow passageway 64 extends between a port 60 in crosshead 56 and an outer exit opening 55. Outer exit opening 55 (shown best in FIG. 4) is defined between cylindrical wall portion 54 and cylindrical tip portion 46 and is concentric with inner exit opening 47. Molten material flowing through second flow passageway 64 exits through opening 55 to be deposited onto conductor bundle 66. The diameter of opening 55 varies with the diameter of conductor bundle 66. As shown, flow passageways 62 and 64 are concentric. Passageways 62, 64 are also substantially parallel in the area of cylindrical tip 46. In effect, second conical element 14 provides means for separating the annular interior cavity of crosshead 56 into flow passageway 62 and 64.

Advantageously, cylindrical tip 46 is aligned in die 16 so that it terminates upstream of die exit face 50a, preferably so that approximately 65% or less of cylindrical tip 46 enters the region defined by cylindrical wall 54. This alignment assists in regulating the diameter of second flow passageway 64 and thus controls the thickness of the final portion of coating jacket material to be applied to the pre-coated conductor. In preferred embodiments, the thickness of the final portion of the coating jacket material is about 0.011–0.012 inches.

To assist in achieving proper alignment of cylindrical tip 46 in the region defined by cylindrical wall 54, a series of raised projecting points (not shown) can be constructed on cylindrical wall 54 to engage a series of dimples (not shown) formed on cylindrical tip 46 at the appropriate position to prevent more than 65% of cylindrical tip 46 from entering the region.

Further, advantageously, the alignment of cylindrical tip 46 in die 16 also determines the back pressure to the initial portion of coating jacket material applied through first flow passageway 62. With proper tooling alignment, the coating jacket material can be separated in first and second flow passageways 62 and 64 and "remarried" as initial and final layers of coating jacket material so as to prevent the formation of gas bubbles between the initial and final portions, thus reducing the chances of delamination or peeling between those portions.

As noted, preferred inner diameters for openings 47 and 55 vary with the diameter of conductor bundle 66. In particular, the following opening diameters for openings 47 and 55, respectively, are preferred for the listed multi-conductor cables. The references to cable size are given by wire gauge and number of conductors. Thus, "18-2" refers to 18 gauge wire including two pre-coated conductors.

| Cable Size | Diameter of Opening 47 (in.) | Diameter of Opening 55 (in.) |
| --- | --- | --- |
| 18-2 | 0.235 | 0.270 |
| 18-3 | 0.270 | 0.300 |
| 14-2 | 0.300 | 0.335 |
| 14-3 | 0.320 | 0.365 |

The diameter of opening 47 is approximately 0.025 to 0.035 inches larger than the diameter of pre-coated conductor or bundle 66, such that the ratio of conductor diameters to diameters of opening 47 range from about 0.87:1 to about 0.92:1.

It will be understood by those of ordinary skill in the art that the tooling of the present invention can be fabricated for a wide range of sizes of single-conductor and multi-conductor cable. The above table is illustrative of tooling sizes for certain commonly-used sizes of multi-conductor cables.

As shown in FIGS. 2–3, die 16 and elements 12 and 14 are sized to fit within an interior region of crosshead 56. In combination with die 16, crosshead 56 serves as a holder sized to allow passage of pre-coated conductor bundle 66 therethrough. Crosshead 56 is formed to include a port 58 connectable to a single source of molten coating material. Port 58 extends generally perpendicular to the direction of movement of conductor bundle 66 through apparatus 10 as illustrated, e.g., in FIG. 3. Port 58 provides means for communicating coating material from the single source to the interior region of crosshead 56.

A circumferential groove 60 is formed in crosshead 56. Groove 60 is angled at the same angle as is tapered surface 34 and is similar in length to elongated slots 44. When second conical element 14 is properly inserted within crosshead 56, groove 60 is substantially aligned with slots 44. Groove 60 is also aligned with port 58 so that molten material passing through port 58 enters groove 60 and passes next through slots 44 to first flow passageway 62 or passes directly from groove 58 to second flow passageway 64.

The operation of apparatus 10 may be explained particularly by reference to FIG. 3. A pre-coated conductor 66 to which a coating jacket is to be applied is fed through a steel guide tube 72 to bore 22 of first conical element 12. Pre-coated conductor 66 may be a bundle of pre-coated wires as used, for example, in a multi-conductor cable. Individual conductors in bundle 66 have already been coated with a layer of thermoplastic coating separate process. This initial layer of coating is usually about 40 to 50 thousandths of an inch thick. Bundle 66 may also include other material such as standard paper, fiber, or tape fillers, although the use of such fillers advantageously can be avoided in practice of the present invention as has been noted.

As conductor or bundle 66 is fed through opening 30, the outer surface contacts the edges of the walls defining opening 30. This contact serves to smooth out surface irregularities immediately before application of the initial layer as has been previously indicated.

As conductor or bundle 66 is fed through bore 22, molten coating material 68 is passed through a fitting 70 and then through port 58. Molten material 58 is typically polyvinylchloride (PVC), but may be any of a number of thermoplastic polymers, including, among others, polyethylene.

Molten material 58 fills circumferential groove 60, from which it can pass either along first flow passageway 62 or second flow passageway 64. The portion of molten material passing to first flow passageway 62 (about 75% by (volume) of the total) must pass through slots 44 in second conical element 14.

Advantageously, when deposited onto conductor or bundle 66 as an initial layer 74 of coating jacket, the molten coating material serves to fill voids existing in the pre-coated layer of individual conductors or between adjacent conductors and/or fillers in a conductor bundle. Because wire bundle 66 rotates as it moves through the tooling, a "swirl" effect is created as the initial layer 74 is deposited onto the wire bundle 66, resulting in the formation of an inwardly-projecting spiral rib of coating material in the spiral void existing between stranded conductors of the wire bundle 66. The rib not only adds strength to the coating jacket (which might be required, for example, by government specifications), but also eliminates the need to use paper wrap or filaments to fill the voids between wire bundle 66 and initial layer 74 of the coating jacket. Avoidance of the use of paper or other fill material reduces material costs and significantly improves processing efficiency, since tearing of the paper wrap is a major cause of downtime in typical wire-coating operations.

The portion of molten material passing to the second flow passageway 64 exits through opening 47 to be deposited as a final portion 76 of the coating layer atop initial portion 74 of the coating layer.

Advantageously, second flow passageway 64 is configured to assist in reducing the viscosity of the coating material, promoting flow of finish coating in the coating material to the outer periphery of the material. The design thus provides for a high gloss finish where required. Moreover, this two-step approach to applying a single coating layer allows application of the coating layer at greater speeds than were heretofore achievable while maintaining an acceptable or even superior quality of the finished cable.

Although the invention has been described in detail with reference to certain preferred embodiments, variations and modifications exist within the scope and spirit of the invention as described and defined in the following claims.

What is claimed is:

1. An extrusion tool for extruding a coating jacket onto at least one pre-coated conductor or conductor bundle, the extrusion tool comprising:
   a frame, the frame being formed to include a port positioned to receive the coating,
   a first conical element mountable in the frame and being formed to include a bore, the bore being sized to allow passage of the pre-coated conductor therethrough,
   a second conical element mateable with the first conical element and cooperating with the first conical element to define a first flow passageway therebetween, the first flow passageway being positioned to receive the pre-coated conductor as its exits from the bore and being connected in fluid communication with the port to supply an initial portion of the coating jacket from the port to the pre-coated conductor as the pre-coated conductor exits the bore and enters the first flow passageway, the second conical element including a tapered portion and terminating in a longitudinally-extending cylindrical tip, and
   a die mountable in the frame, said die having an exit face, the die cooperating with the tapered portion and the cylindrical tip of the second conical element to define a second flow passageway therebetween connected in fluid communication with the port to supply a final portion of the coating jacket from the port to the pre-coated conductor as the pre-coated conductor exists the first flow passageway, said cylindrical tip terminating within said die at a position upstream of the die exit face, to thereby cause the initial and final coating jackets to remarry within said die in a manner whereby no gassing occurs.

2. The tool of claim 1, wherein the tapered portion is formed to include a plurality of slots providing a flow path for coating to flow between the port and the first flow passageway.

3. The tool of claim 2, wherein the second conical element includes an annular end opposite the cylindrical tip, and the slots extend between the annular end and the cylindrical tip.

4. The tool of claim 1, wherein the first and second flow passageways are concentric along their entire lengths and include substantially parallel portions adjacent the cylindrical tip.

5. The tool of claim 1, wherein the die includes an interior conical region and an interior cylindrical region and the cylindrical tip is of a length so that approximately 65% or less of the cylindrical tip extends into the cylindrical region when the tool is assembled.

6. The tool of claim 1, wherein the first flow passageway terminates in an inner exit opening, the second flow passageway terminates in an outer exit opening concentric with the inner exit opening, and the ratio of the diameter of the inner exit opening to the diameter of the outer exit opening ranges from about 8.7:10 to about 9:10.

7. The tool of claim 6, wherein the inner exit opening is formed in the cylindrical tip.

8. The tool of claim 6, wherein the diameter of the inner exit opening ranges from about 0.235 inches to about 0.320 inches.

9. The tool of claim 1, wherein the pre-coated conductor is at least one pre-coated wire, the first flow passageway terminates in an inner exit opening, and the ratio of the diameter of the pre-coated wire to the diameter of the inner exit opening is about 0.87:1 to about 0.92:1.

10. The tool of claim 1, wherein the first conical element includes a tapered end formed to include a tapered end opening connecting the bore and the first flow passageway, the first flow passageway terminates in an inner exit opening, and the diameter of the tapered end opening is approximately equal to the diameter of the inner exit opening.

11. The tool of claim 10, wherein the inner exit opening is formed in the cylindrical tip.

12. The tool of claim 10, wherein the diameter of the inner exit opening ranges from about 0.235 inches to about 0.320 inches.

13. The tool of claim 1, wherein the final portion of the coating jacket is approximately 0.011 inches thick.

14. The tool of claim 1, wherein the initial portion of the coating jacket is greater than or equal to about 50% of the total thickness of the coating jacket and the final portion of the coating jacket is less than or equal to about 50% of the total thickness of the coating jacket.

15. An extrusion tool for extruding a jacket of coating from a single coating source onto at least one pre-coated conductor, the tool comprising:
   a holder formed to include an interior region sized to allow passage of the pre-coated conductor therethrough and means for communicating coating from the single source to the interior region,
   a first element mounted to extend into the interior region to define an annular cavity between the first element and the holder, and
   a second element mounted in the interior region, the second element including separator means for separating the annular cavity into first and second flow passageways and longitudinally-extending cylindrical tip means for forming a terminal portion of the first flow passageway terminating in an inner exit opening, the first flow passageway being defined between the first element and the separator means, the second flow passageway being defined between the separator means and the holder, both the first and the second flow passageways being connected in fluid communication with the communicating means so that coating from the communicating means flows simultaneously to both the first and second flow passageways for extrusion onto the pre-coated conductor to form the coating jacket thereon as the pre-coated conductor passes through the interior region, said holder including a die having an exit face and having a cylindrical wall upstream of the exit face that cooperates with said cylindrical tip to partially define the second passageway, said cylindrical tip extending into the second passageway defined by said cylindrical wall and terminating upstream of the die exit face, to thereby cause flows from both said first and second flow passageways to come together within said die in a manner whereby no gassing occurs.

16. The tool of claim 15, wherein the communicating means includes at least one slot formed in the second element.

17. The tool of claim 16, wherein the second element includes an annular portion integral with the separator means and lying opposite the cylindrical tip means, and the at least one slot extends between the annular portion and the cylindrical tip means.

18. The tool of claim 15, wherein the first and second flow passageways are concentric along their entire lengths and include substantially parallel portions adjacent the cylindrical tip means.

19. The tool of claim 15, wherein the terminal portion of the first flow passageway is substantially parallel to a portion of the second flow passageway adjacent the terminal portion.

20. The tool of claim 15, wherein the second flow passageway terminates in an outer exit opening concentric with the inner exit opening, and the ratio of the diameter of the inner exit opening to the diameter of the outer exit opening ranges from about 8.7:10 to about 9:10.

21. The tool of claim 20, wherein the diameter of the inner exit opening ranges from about 0.235 inches to about 0.320 inches.

22. The tool of claim 15, wherein the at least one pre-coated conductor is a wire and the ratio of the diameter of the inner exit opening to the diameter of the wire is about 0.87:1 to about 0.92:1.

23. The tool of claim 15, wherein the first element is formed to include a tapered end opening and the diameter of the tapered end opening is approximately equal to the diameter of the inner exit opening.

24. The tool of claim 23, wherein the diameter of the inner exit opening ranges from about 0.235 inches to about 0.320 inches.

25. A method for extruding coating from a single source onto at least one pre-coated conductor using an extrusion tool including a frame, the frame being formed to include an interior region including a cylindrical portion and a port for communicating coating from the single source to the interior region, the tool further including means for providing a branched flow passageway in the interior region, the providing means terminating in a cylindrical tip mateable with the cylindrical portion so that the branches of the branched flow passageway are concentric at their downstream ends, the method comprising the steps of:
  (a). arranging the providing means in the frame so that the cylindrical tip extends into the cylindrical portion but terminates upstream of an exit face of the interior region,
  (b). moving the conductor into the interior region,
  (c). feeding the coating from the single source to the port,
  (d). flowing a first portion of the coating from the port through a first branch of the branched passageway for extrusion onto the conductor as an initial portion of the coating jacket, and
  (e). flowing a second portion of the coating from the port through a second branch of the branched passageway for extrusion onto the initial portion of the coating jacket beyond the cylindrical tip but upstream of the exit face of the interior region to form a final portion of the coating jacket, whereby no gassing occurs.

26. The method of claim 25, wherein the first portion is approximately 75% of the total thickness of coating applied to the conductor and the second portion is about 25% of the total thickness of coating applied to the conductor.

27. The method of claim 26, wherein the temperature of the first portion of coating in the first branch is approximately equal to the temperature of the second portion of coating in the second branch.

28. The method of claim 25, further including the step of forming a rib of coating material between the initial layer of the coating jacket and the at least one pre-coated conductor.

29. An extrusion tool for extruding a coating jacket onto a pre-coated conductor, the extrusion tool comprising:
  a frame, the frame being formed to include a port for connection to a single source of coating and a hollow interior region sized to allow the conductor to extend therethrough,
  means mountable in the interior region for providing a branched flow passageway to receive coating flowing from the port, the providing means including a first element, a second element concentric with the first element and cooperating therewith to form a first branch of the branched passageway, the second element including a tapered portion and a longitudinally-extending cylindrical tip portion, and a third element mateable with the second element and cooperating with the tapered portion and the cylindrical tip portion to form a second branch of the branched passageway so that coating flowing from the port passes simultaneously through the first and second branches for extrusion onto the pre-coated conductor as it passes through the interior region, said third element including a die having an exit face and having a cylindrical wall upstream of the exit face that cooperates with said cylindrical tip to partially define the second branch of the branched passageway, said cylindrical tip extending into the second branch defined by said cylindrical wall and terminating upstream of the die exit face, to thereby cause flows from both of the branches to come together within said die in a manner whereby no gassing occurs.

30. The tool of claim 29, wherein the second element includes a plurality of slots providing a flow path between the port and the first branch.

31. The tool of claim 29, wherein the first and second branches are concentric along their entire lengths and include substantially parallel portions adjacent the cylindrical tip.

32. The tool of claim 29, wherein the cylindrical tip is of a length so that approximately 65% or less of the cylindrical tip extends into the region formed by said cylindrical wall when the tool is assembled.

* * * * *